C. B. MILLS.
BRUSH HOLDER FOR DYNAMO ELECTRIC MACHINES.
APPLICATION FILED MAY 9, 1911. RENEWED FEB. 1, 1912.
1,168,021.
Patented Jan. 11, 1916.
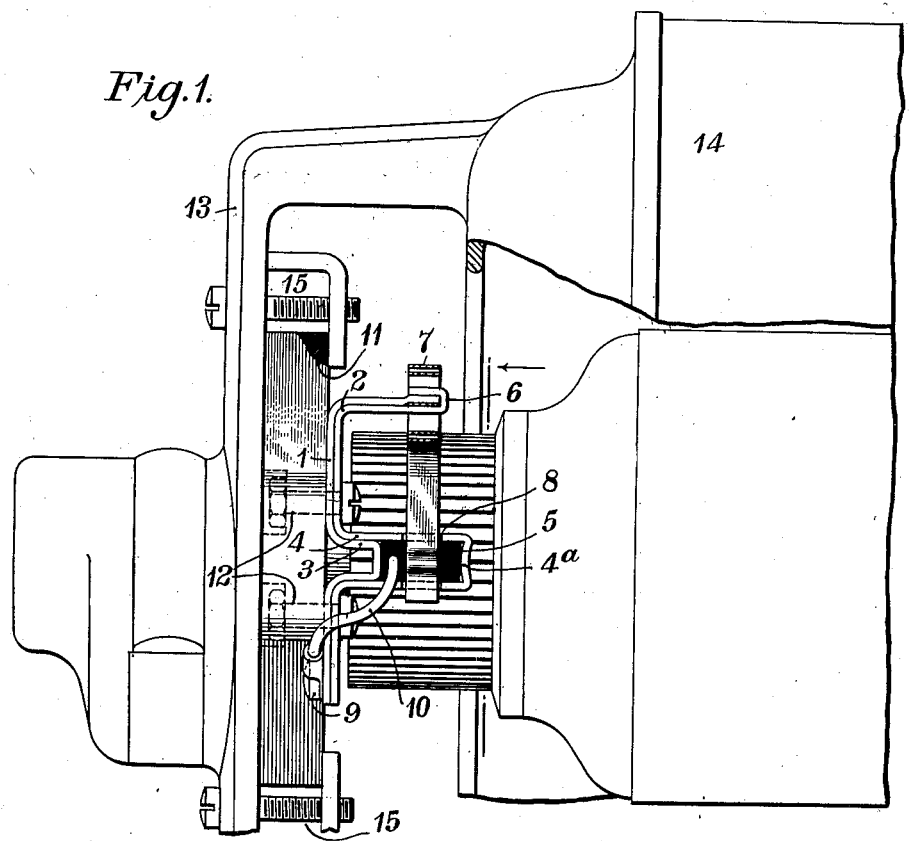
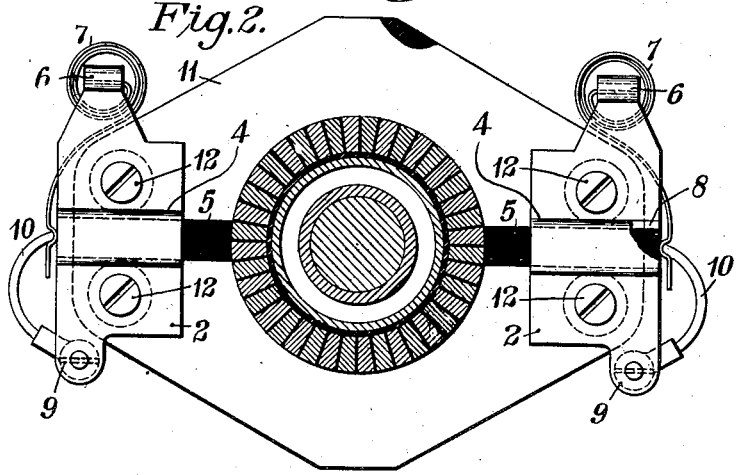
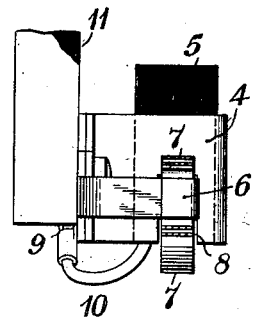
WITNESSES:
C. L. Belcher
Otto S. Schairer
INVENTOR
Chester B. Mills
BY
Wesley G. Carr
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

BRUSH-HOLDER FOR DYNAMO-ELECTRIC MACHINES.

1,168,021.      Specification of Letters Patent.      Patented Jan. 11, 1916.

Application filed May 9, 1911, Serial No. 626,111. Renewed February 1, 1912. Serial No. 674,827.

*To all whom it may concern:*

Be it known that I, CHESTER B. MILLS, a citizen of the United States, and a resident of East McKeesport, in the county of Allegheny and State of Pennsylvania, have invented a new and useful Improvement in Brush-Holders for Dynamo-Electric Machines, of which the following is a specification.

My invention relates to brush-holders for dynamo-electric machines, and it has for its object to provide a useful and desirable brush-holder which can be conveniently and inexpensively made from sheet metal parts.

Figure 1 of the accompanying drawing is a side view of a portion of a motor having a brush-holder embodying my invention. Fig. 2 is a side view of two of the brush-holders and their support, and Fig. 3 is a plan view of one of the brush-holders.

The brush-holder comprises two side-by-side pieces of sheet metal 1 and 2, the body portions of which are substantially rectangular in shape and are respectively bent to form laterally extending nested U-shaped projections 3 and 4 of different lengths between which is a substantially rectangular space constituting a box for the brush 5.

The end of the longer U-shaped projection 4 is bent or curved inwardly at 4ª, in order that it may engage the side of the brush and thus prevent the sharp corners thereof from engaging the rounded corners of the bent sheet metal. In this manner, much greater freedom of movement of the brush is insured and there is substantially no possibility of its sticking in its box.

Corresponding end portions of the sheet metal plates are also bent to provide a socket 6 in which the inner end of a spiral spring 7 is clamped. The other end of the spiral spring extends laterally from the main or spiral portion thereof and bears upon the outer end of the brush 5, the brush box being provided with slots 8 to receive the end of the spring. The end of the brush-holder that is opposite the socket 6 is provided with a screw 9 that constitutes a binding post for connecting the brush-holder to a circuit and also for one end of a conductor 10 that extends therefrom to the brush.

The two sheet metal plates constituting the brush-holder are clamped together, and to an insulating block 11 constituting a support therefor, by means of bolts 12, the block 11 being mounted upon and adjustably clamped to the end bracket 13 of a dynamo-electric machine 14 by clamping devices 15.

The structure hereinbefore set forth is both inexpensive and compact and is so formed as to provide a brush-holding box and a spring support that project laterally from one side of the body portion which is clamped to one face of an adjustable insulating and supporting block. It is thus apparent that a strong and effectively insulated brush holder structure is provided which embodies a minimum number of effectively disposed parts.

The form, dimensions and relations of parts are, of course, subject to modification within the scope of the appended claims.

I claim as my invention:

1. A brush-holder comprising two side-by-side pieces of sheet metal having U-shaped portions of different lengths nested together to form a brush box.

2. A brush-holder comprising two side-by-side pieces of sheet metal having U-shaped portions of different lengths nested together to form a brush box and laterally extending end portions, and a spring carried by the said end portions and extending over the brush box.

3. A brush-holder comprising two side-by-side pieces of sheet metal having U-shaped portions of different lengths nested together to form a brush box, the end of the longer U-shaped portion being curved inwardly.

4. A brush-holder comprising two side-by-side pieces of sheet metal having U-shaped portions of different lengths nested together to form a brush box and laterally extending end portions, and a spring clamped between the said end portions and extending over the brush box.

5. A brush-holder comprising two side-by-side pieces of sheet metal, intermediate portions of which are spaced apart to form a brush box between them and end portions of which are extended laterally, and a spring clamped between the said end portions and extending over the brush box.

6. A brush-holder comprising two side-by-side pieces of sheet metal having U-shaped portions of different lengths nested together to form a brush box, the end of the longer U-shaped portion being curved inwardly, the said pieces also having laterally extending end portions, and a spring carried by the said end portions and extending over the box.

7. A brush-holder comprising two side-by-side pieces of sheet metal having U-shaped portions of different lengths nested together to form a brush box, and a spring carried by the said pieces and extending over the brush box.

8. In a dynamo-electric machine, the combination with an adjustable insulating block, of a brush holder clamped to said block and comprising two superposed pieces of sheet metal, one of which has a laterally bent box portion adapted to receive a movable brush.

9. In a dynamo-electric machine, the combination with an adjustable insulating block, of a brush holder comprising two superposed pieces of sheet metal, one of which has a laterally projecting intermediate portion of box form to receive a brush and both of which have their end portions clamped to one side of said insulating block.

10. In a dynamo-electric machine, the combination with a bracket and an adjustable insulating block clamped thereto, of a brush holder comprising two superposed pieces of sheet metal having their ends clamped to one side of said block and their middle portions shaped to constitute a box for a movable brush.

11. In a dynamo-electric machine, the combination with an adjustable insulating block and a support therefor, of a brush holder comprising two pieces of sheet metal having their ends clamped to one side of said block and shaped to constitute an intermediate box for a movable brush.

12. In a dynamo-electric machine, the combination with an adjustable insulating block and a support therefor, of a brush holder comprising a double-layer sheet metal body having its ends clamped to one face of said block and shaped to constitute an intermediate laterally projecting box for a movable brush.

In testimony whereof, I have hereunto subscribed my name this 24th day of April, 1911.

CHESTER B. MILLS.

Witnesses:
 STANLEY STROUD,
 B. B. HINES.